(12) United States Patent
Rouger

(10) Patent No.: US 6,942,439 B2
(45) Date of Patent: Sep. 13, 2005

(54) EXPANSION DOWEL BUSHING WITH A COMPRESSIBLE SECTION

(75) Inventor: Claire Rouger, Valence (FR)

(73) Assignee: Societe de Prospection et d'Inventions Techniques Spit, Bourg-les-Valence (FR)

( * ) Notice: Subject to any disclaimer, the term of this patent is extended or adjusted under 35 U.S.C. 154(b) by 69 days.

(21) Appl. No.: 10/447,260

(22) Filed: May 29, 2003

(65) Prior Publication Data

US 2004/0018068 A1 Jan. 29, 2004

(30) Foreign Application Priority Data

May 30, 2002 (FR) .......................................... 02 06647

(51) Int. Cl.[7] .............................................. F16B 13/40
(52) U.S. Cl. ........................... 411/61; 411/60.1; 411/71
(58) Field of Search .............................. 411/39, 42, 61, 411/60.1, 57.1, 60.3, 71, 74, 5

(56) References Cited

U.S. PATENT DOCUMENTS

| | | | | |
|---|---|---|---|---|
| 1,972,715 A | * | 9/1934 | Pleister | 411/42 |
| 3,515,028 A | | 6/1970 | Patton | |
| 4,088,054 A | * | 5/1978 | Lippacher et al. | 411/71 |
| 4,484,848 A | * | 11/1984 | Ott | 411/24 |
| 4,692,076 A | | 9/1987 | Herb | |
| 4,720,224 A | * | 1/1988 | Peterken | 411/36 |
| 4,770,581 A | * | 9/1988 | Limbrick | 411/50 |
| 4,854,793 A | * | 8/1989 | Ollivier et al. | 411/49 |
| 4,900,205 A | | 2/1990 | Sadri | |
| 4,917,552 A | * | 4/1990 | Crawford | 411/32 |
| 5,275,519 A | | 1/1994 | Hainke | |
| 5,716,177 A | | 2/1998 | Schaffer | |
| 5,791,845 A | | 8/1998 | Fulop | |
| 6,524,045 B2 | * | 2/2003 | Pourtier | 411/60.1 |
| 6,579,049 B2 | * | 6/2003 | Kaibach | 411/61 |

FOREIGN PATENT DOCUMENTS

| | | |
|---|---|---|
| DE | 76 25 795 U | 8/1976 |
| DE | 3023411 A1 | 1/1982 |
| EP | 0 099 028 A | 1/1984 |
| GB | 2 016 106 A | 9/1979 |
| WO | WO 92/04547 | 3/1992 |
| WO | WO 96/25601 | 8/1996 |

* cited by examiner

Primary Examiner—Flemming Saether
(74) Attorney, Agent, or Firm—Lowe Hauptman & Berner, LLP

(57) ABSTRACT

The dowel's expansion bushing (2) is placed around a threaded rod (9) inserted in the bushing's (2) expansion core (3), between the strut (8) and the core (3). The bushing (2) includes a section (16) compressible along its centerline, which includes a shearing system (24) placed such that, after shearing, the bushing (2) is shortened along its centerline. The bushing also includes, on its section (25) next to the strut (8), coupling and axial holding spurs (50). The bushing (2) is composed of a cut sheet metal blank, rolled on itself, except for the part with the spurs (50).

20 Claims, 3 Drawing Sheets

EXPANSION DOWEL BUSHING WITH A COMPRESSIBLE SECTION

FIELD OF THE INVENTION

This invention concerns an expansion dowel bushing placed around a threaded rod in a strut and a bushing expansion core, part of said bushing being compressible or collapsible along its centerline.

BACKGROUND OF THE INVENTION

This type of dowel is already known, particularly in documents WO 96/25601, WO 92/04547 and DE 3023411.

When attaching a part to a support, e.g. masonry, expansion dowel bushings may be used in anchor holes drilled in the support. The attached part may not be fully flush with the support. By using a dowel bushing with a compressible section, the part may often be placed flush against the support by compressing the bushing's compressible section. However, sometimes the compression along the compressible bushing's centerline is not sufficient before the dowel is fully anchored in the anchoring hole to ensure that the part is flush with the support.

Moreover, with such a dowel, when attaching a part that is not at risk from coming away from the support because of its thickness and when the threaded rod is placed vertically, the strut is pulled by gravity out of the dowel hole drilled in the part, the strut does not oppose the radial forces that tend to move the part on the support surface and, finally, does not prevent lateral movement. This may happen with a conveyor belt base plate subject to vibration.

SUMMARY OF THE INVENTION

The invention attempts to eliminate such risks.

To this end, provided is an expansion dowel bushing as defined above, wherein the bushing's compressible part includes a shearing system such that after shearing the bushing is shortened along its centerline and a system is implemented to hold the strut along its centerline.

In this manner, under the force the core exerts on the bushing along its centerline, during its expansion, the bushing shearing and shortening by shearing on the one hand, and its compression and shortening by compression on the other, combine to ensure sufficient overall shortening along the axis to bring the part in flush before anchoring the dowel.

Moreover, as the strut is held along the axis, i.e. prevented from sliding along the threaded rod, it will be held in the part's attachment hole ensuring lateral blocking.

Preferentially, the shearing system is implemented so as to shear before the compressible parts are compressed.

Advantageously, the shearing system includes shearing couplings connecting two bushing parts placed so as to interlock along the centerline, each coupling being preferentially inclined on the centerline plane.

Preferentially, the fitting bushing sections are compressible.

In the invention dowel's preferential implementation, the system for holding the strut along the centerline is implemented on that part of the bushing's compressible section so as to remain adjacent to the strut after shearing.

Preferentially, the holding system along the centerline includes coupling spurs.

In the preferred implementation of the invention dowel, the bushing is made of a sheet metal blank cut and partially rolled on itself.

BRIEF DESCRIPTION OF THE DRAWINGS

The invention will be better understood with the following description of the preferred dowel invention implementation, referencing the annexed drawings, wherein.

DETAILED DESCRIPTION OF THE PREFERRED EMBODIMENTS

Figure 1:
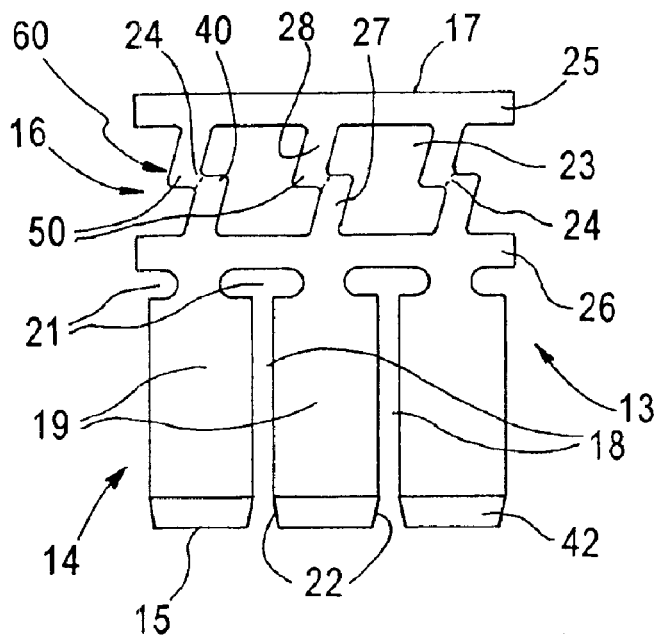
FIG. 1 represents a view of the sheet metal blank being rolled on itself to form the expansion bushing in accordance with an embodiment of the invention.
Figure 2:
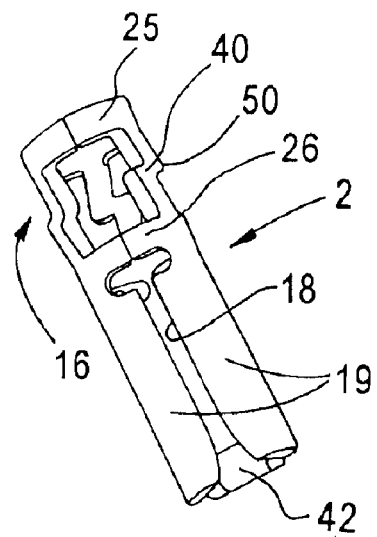
FIG. 2 represents a perspective view of the expansion bushing obtained from the blank in FIG. 1.

The dowel represented in the drawing includes a threaded set 1, along centerline 20, an expansion bushing 2, and a conical expansion core 3. Threaded set 1 includes a threaded rod or screw 9 and a tubular strut 8. The threaded rod 9 includes a threaded end 4 and a screw-nut type head 6. Seating washer 7 is placed between screw-head 6 and strut 8.

Strut 8's diameter is more or less the same as the anchoring hole in which the dowel is to be anchored.

Expansion dowel 2, with the same exterior diameter as tubular strut 8, is placed around the section of rod 9 between strut 8 and expansion core 3, between ring-shaped edge 10 on strut 8 opposite screw-head 6. Core 3 is threaded inside and rod 9's threaded end 4 is inserted there. Core 3's large base 11, turned towards the free end of rod 1, has a diameter more or less equal to strut 8's exterior diameter. Core 3's small base 12, turned towards rod 1's head 6, has a diameter slightly smaller than expansion bushing 2's inner diameter, to be inserted there and cause the bushing's expansion.

The expansion bushing is here made up of sheet metal blank 13 cut and rolled on itself, except for the parts located between areas 40 and 50 of the compressible parts, said parts remaining flat, around a centerline naturally assimilated with dowel centerline 20.

Blank 13 includes two cut zones, the first, 14, from edge 15, which will be used to introduce expansion cone 3, the second, 16, near opposite edge 17, which will press against strut 8's ring-shaped edge 10.

Cuts 18 in zone 14, which will become the bushing expansion area, will be shaped to clear expansion legs 19. Cuts 18 are openings in the longitudinal edges, which will be parallel to centerline 20, expanding to 22 near edge 15 to favor expansion core 3's later penetration and they end, on the side opposite edge 15 with grommets 21, slightly oblong, which will prevent, during expansion, any bushing tears.

Cuts 23 in zone 16 are shaped in a double staircase so that this area will become a section of the bushing compressible along the centerline with shearing couplings 24 connecting to parts 25, 26 of this part of the bushing which will, after shearing, interlock along the centerline.

More precisely, each part of the fitting includes a comb 25, 26 of compressible teeth 27, 28 with edges collinear to shearing coupling 24, parallel and inclined in a plane perpendicular to edges 15, 17 and end-to-end, head-to-tail, along very narrow shearing coupling 24 represented by the dotted line on FIG. 1. Compressible teeth 28 located on the strut side include, on the edge opposite shearing link 24, corners which will become, after partially rolling blank 13, coupling spurs 50 for holding the bushing along the centerline, implemented in this fashion on part 25 of section 16 (25, 26) of the compressible bushing placed to remain next to strut 8 after shearing. Compressible teeth 27 on part 26 of compressible bushing section 16 (25, 26) include, on the edge opposite shearing coupling 24, corners which will become, after partially rolling blank 13, anti-rotation spurs 40, which will complement spurs 50 to provide an anti-rotation function before shearing.

We will now describe sheet metal blank 13's rolling process for creating bushing 2. As per the techniques known to a person skilled in the art, a sheet metal blank is generally rolled to form a bushing using a form and counter form; The form may be a half-cylinder shell, or a small pulley and the counter form may consist of a former. In order to obtain expansion bushing 2, sheet metal blank 13 is rolled between a form and a counter form, except for corners 40 and 50. In this manner, by creating recesses on the form, the bushing compressible parts corresponding to the area covering compressible teeth 27, 28, i.e. band 60 or the part of teeth 27, 28 located on either side of shearing link 24, i.e. corners 40, 50. Therefore these parts remain flat, or practically flat, and create flat protrusions, tangential to bushing 2, and corresponding to spurs 40, 50. Lastly, compressible teeth 28, 27 on combs 25, 26 include, respectively, coupling and axial holding spurs 50 and anti-rotation spurs 40.

After rolling the blank as described above, teeth 27, 28 are inclined on the dowel's centerline plane whereas spurs 40 and 50 form flat protrusions tangential to the cylinder formed by the bushing. Spurs 40 and 50 are shaped so that, before shearing, they hook in the wall of coupling point 29, which will be described later, in order to provide the bushing's anti-rotation function. After shearing, bushing centerline coupling and axial holding spurs 50 are shaped to couple with coupling point 29 in the wall in order to hold the bushing in its axial position, but to resist the compression forces introduced when the user screws it in. Under the compressive force, which, when the bushing core expands, is exerted perpendicularly to edges 15, 17, links 24 shear before teeth 27, 28 on combs 25, 26 slide over each other and combs 25, 26 interlock to shorten the bushing along its centerline.

After the combs interlock, their teeth 27, 28 may be compressed to create, in addition to shortening by shearing, additional shortening by bushing 2's compression.

Note that the blank interior is reduced progressively from edge 15 and on small section 42 to create, after rolling the blank, a small conical opening on the bushing corresponding to conical core 3.

Figure 3:
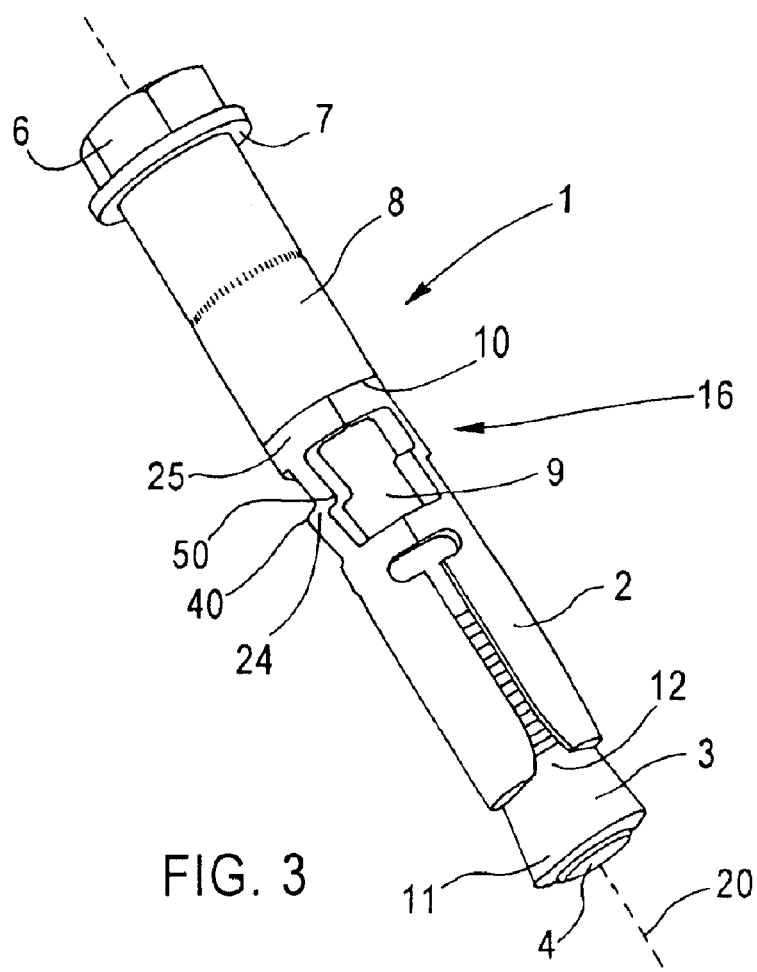
FIG. 3 represents a perspective view of the dowel in accordance with an embodiment of the invention.
Figure 4:
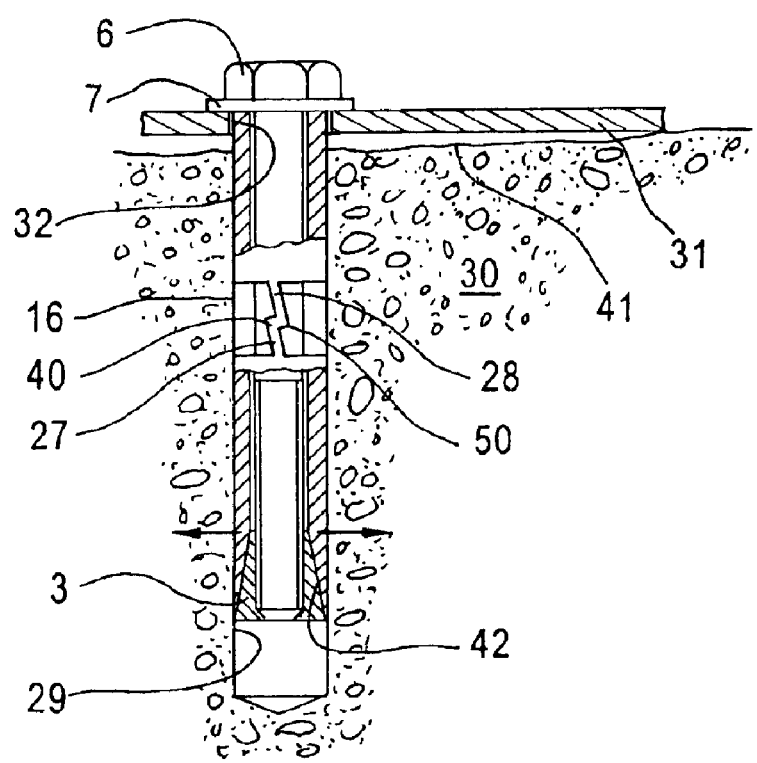
FIG. 4 represents a cross-section along the dowel centerline placed in the anchoring hole before the part is attached.
Figure 5:
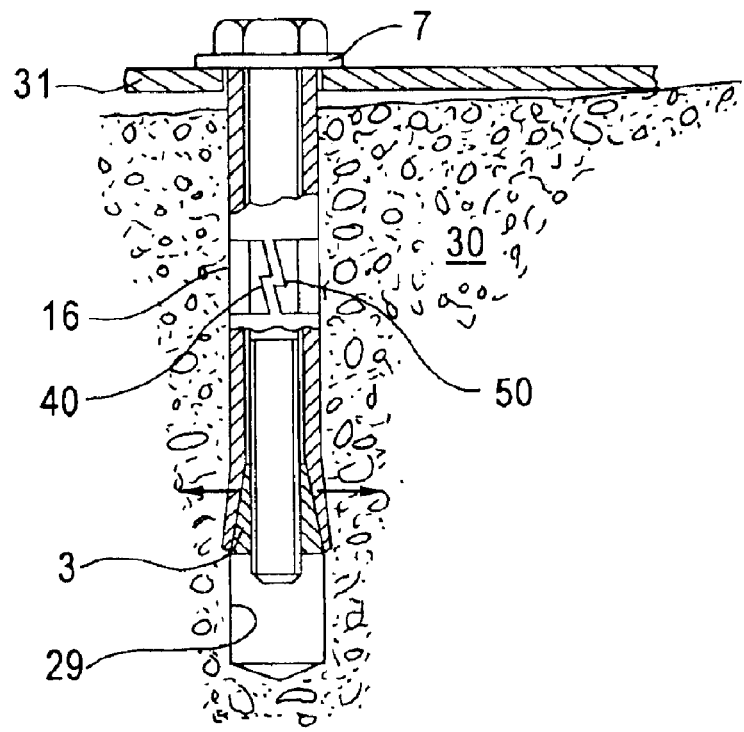
FIG. 5 represents a cross-section along the dowel centerline after the expansion core has expanded.

Having described the three elements of the invention dowel, we will now describe its operation. With these three elements placed in their relative positions as shown in FIG. 3, an anchoring hole 29 previously drilled in support material 30, in which part 31 must be fastened, in which dowel hole 32 has also been drilled, the dowel is placed in hole 32 on the part and inserted into anchoring hole 29 such that washer 7 presses against part 31, which is not flush with support 30 (FIG. 4). Beginning with screw-nut 6, rod 9 is screwed into core 3 through strut 9 and bushing 2, prevented from rotating in hole 29 by spurs 40 and 50, which pushes core 3 in bushing 2 and causes expansion in the bushing, anchoring it and core 3 (FIG. 5).

Figure 6:
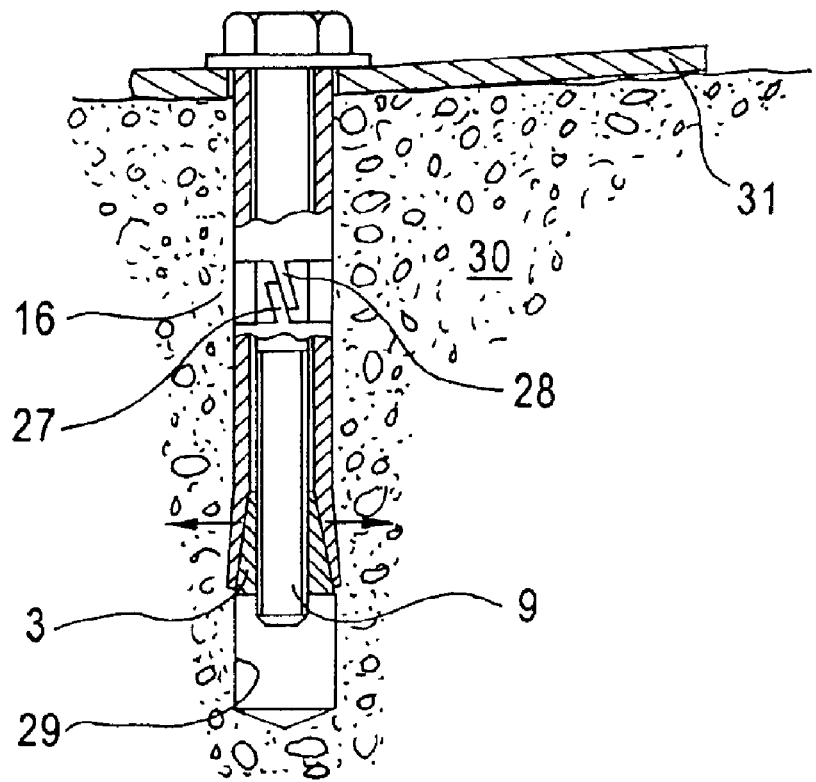
FIG. 6 represents a cross-section along the dowel centerline after the part has been attached.
Figure 7:
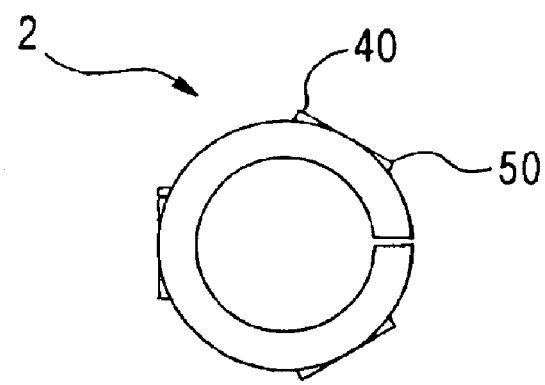
FIG. 7 represents a forward cross-section of the expansion dowel obtained from the blank in FIG. 1.

By continuing to screw rod 9 into core 3, anchored in hole 29, couplings 24 on bushing 2's compressible section 16 are sheared, shortening bushing area 16 by shearing, causing rod 9's and therefore threaded set 1's descent into anchoring hole 29 and, in this manner, part 31 coming flush against free surface 41 on support material 30 (FIG. 6). Note that in the illustrated example part 31 to be fastened, has been pressed flush against support material 30 after shortening the bushing by shearing. If necessary, compressing teeth 27, 28 by continuing to screw the rod would have shortened the bushing even more. After placing washer 7 against part 31 and part 31 against support material 30, continuing to screw rod 9 in expansion core 3 does not cause rod 9 to descend into anchoring hole 29, but causes core 3 to rise in hole 29, continuing to expand bushing 2 and in the end, anchoring the dowel and fastening part 31 to support 30.

If the part does not need to be entirely flush with the support or if only part of the shortening by shearing is required, i.e. if after placement against the support, the combs are only partially interlocked, the bushing's axial holding spurs 50 prevent the bushing placed next to the strut, if threaded set 1 is placed vertically, from falling, under the effect of gravity, which could cause the strut to leave dowel hole 32. Holding spurs 50 provide protrusions tangential to the cylinder formed by the bushing, pressing against the inside of anchoring hole 29, preventing bushing part 25, placed to remain adjacent to strut 8, from falling, under the effect of gravity, and also, in the same manner, preventing strut 8 from falling, under the effect of gravity. Strut 8 remains in contact with hole 32 drilled in the part and the dowel opposes the radial forces exerted on the part.

In the same way as described above, continuing to screw rod 9 causes core 3 to rise and provide final anchoring for the bushing.

What is claimed is:

1. An expansion dowel bushing for use with a threaded rod and a matching threaded core, said bushing being adapted to be located on the threaded rod between a head of the threaded rod and the threaded core, wherein said bushing is an at least partially rolled up, cut-out, unitary piece of sheet material comprising an axially compressible sleeve portion including a shearable portion which allows said axially compressible sleeve portion to be axially shortened after shearing axially compressible sleeve portion, at said shearable portion, into two pieces and axially compressing said two pieces toward each other upon the threaded core being rotated with respect to the threaded rod so as to move axially toward the head of the threaded rod.

2. The bushing of claim 1, wherein said at least partially rolled up, cut-out, unitary piece of sheet material further comprises at least one anti-rotation projection for preventing said bushing from rotating in a hole in a substrate where said bushing is to be received.

3. The bushing of claim 2, wherein said at least one anti-rotation projection is generally flat and tangential to a generally cylindrical outer surface of said at least partially rolled up, cut-out, unitary piece of sheet material.

4. The bushing of claim 2 wherein said axially compressible sleeve portion further comprises two parts connected by at least one link that defines both said shearable portion and said at least one anti-rotation projection, said parts being adapted to nest together axially after shearing said link upon the threaded core being rotated with respect to the threaded rod so as to move axially toward the head of the threaded rod.

5. The bushing of claim 4, wherein said link is inclined with respect to an axis of said bushing.

6. The bushing of claim 1, wherein said axially compressible sleeve portion further comprises first and second tubular parts connected by a plurality of links which define said shearable portion;

each of said links includes first and second legs which are connected to said first and second tubular parts, respectively, and adapted to be separated from each other upon shearing said link; and said first tubular part and legs and said second tubular part and legs respectively define first and second combs which are adapted to nest together axially after shearing said links upon the threaded core being rotated with respect to the threaded rod so as to move axially toward the head of the threaded rod.

7. The bushing of claim 6, wherein said legs define anti-rotation projections for preventing said bushing from rotating in a hole in a substrate where said bushing is to be received.

8. The bushing of claim 7, wherein said first and second legs define compressible teeth of said combs, said teeth are adapted to butt together in pairs, head-to-tail when said first and second combs nest together.

9. The bushing of claim 7, wherein said first and second legs are inclined with respect to an axis of said bushing.

10. The bushing of claim 9, wherein said legs are portions of the piece of sheet material that are not rolled up and therefore remain generally flat and tangential to a generally cylindrical outer surface of said at least partially rolled up, cut-out, unitary piece of sheet material which is metal.

11. The bushing of claim 7, wherein said at least partially rolled up, cut-out, unitary piece of sheet material further comprises a radially expansible portion which is adapted to be positioned closer to the threaded core than said axially compressible sleeve portion and to be radially expanded by the threaded core upon the threaded core being rotated with respect to the threaded rod so as to move axially toward the head of the threaded rod.

12. The bushing of claim 11, wherein said radially expansible portion comprises a plurality of spaced legs adapted to expand radially upon the threaded core being rotated with respect to the threaded rod so as to move axially toward the head of the threaded rod.

13. The bushing of claim 12, wherein said at least partially rolled up, cut-out, unitary piece of sheet material further comprises grommets positioned between adjacent said spaced legs to prevent tearing of said bushing.

14. The bushing of claim 12, wherein said legs have a thickness progressively decreasing towards distal ends thereof to define a conical opening for the threaded core.

15. The bushing of claim 6, wherein said legs are portions of the piece of sheet material that are not rolled up and therefore remain generally flat.

16. An anchor, comprising:

a threaded rod having a head and a matching threaded core; and a bushing located on the threaded rod between said head and the threaded core, wherein said bushing is an at least partially rolled up, cut-out, unitary piece of sheet material comprising an axially compressible sleeve portion including a shearable portion which allows said axially compressible sleeve portion to be axially shortened after shearing axially compressible sleeve portion, at said shearable portion, into two pieces and axially compressing said two pieces toward each other upon the threaded core being rotated with respect to the threaded rod so as to move axially toward the head of the threaded rod.

17. The anchor of claim 16, wherein said axially compressible sleeve portion further comprises first and second tubular parts connected by a plurality of links which define said shearable portion;

each of said links includes first and second legs which are connected to said first and second tubular parts, respectively, and adapted to be separated from each other upon shearing said link;

said first tubular part and legs and said second tubular part and legs respectively define first and second combs which are adapted to nest together axially after shearing said links upon the threaded core being rotated with respect to the threaded rod so as to move axially toward the head of the threaded rod; and said first and second legs define anti-rotation projections for preventing said bushing from rotating in a hole in a substrate where said bushing is to be received.

18. The anchor of claim 17, wherein said at least partially rolled up, cut-out, unitary piece of sheet material further comprises a radially expansible portion which is positioned closer to the threaded core than said axially compressible sleeve portion and radially expansible by the threaded core upon the threaded core being rotated with respect to the threaded rod so as to move axially toward the head of the threaded rod.

19. The anchor of claim 17, further comprising a tubular spacer located on said threaded rod between said head and said bushing, wherein said first and second legs are inclined with respect to an axis of said bushing.

20. An expansion dowel bushing for use with a threaded rod and a matching threaded core, said bushing being adapted to be located on the threaded rod between a head of the threaded rod and the threaded core, wherein said bushing is made from a cut-out, unitary piece of sheet material by partially rolling up said cut-out, unitary piece of sheet material to have a generally cylindrical shape, except predetermined portions of said cut-out, unitary piece of sheet material which are not rolled up and therefore remain generally flat; and said predetermined portions are links connecting two rolled up portions of said cut-out, unitary piece of sheet material, said links being shearable to allow said bushing to be axially shortened alter shearing said links and axially compressing said two rolled up portions toward each other upon the threaded core being rotated with respect to the threaded rod so as to move axially toward the head of the threaded rod.

* * * * *